(12) United States Patent
Boville

(10) Patent No.: US 7,389,841 B2
(45) Date of Patent: Jun. 24, 2008

(54) DEVICE FOR FIXING A HOUSING, ESPECIALLY A HOUSING PERTAINING TO A MOTOR VEHICLE BATTERY, TO A CARRIER PLATE

(75) Inventor: Daniel Boville, Paris (FR)

(73) Assignee: A. Raymond & CIE (FR)

( * ) Notice: Subject to any disclaimer, the term of this patent is extended or adjusted under 35 U.S.C. 154(b) by 334 days.

(21) Appl. No.: 10/520,459

(22) PCT Filed: Jun. 7, 2003

(86) PCT No.: PCT/EP03/06010

§ 371 (c)(1),
(2), (4) Date: Jun. 21, 2005

(87) PCT Pub. No.: WO2004/006359

PCT Pub. Date: Jan. 15, 2004

(65) Prior Publication Data

US 2005/0225283 A1    Oct. 13, 2005

(30) Foreign Application Priority Data

Jul. 6, 2002    (DE) ................. 102 30 492

(51) Int. Cl.
*B60R 16/04* (2006.01)
(52) U.S. Cl. ................. 180/68.5; 429/100
(58) Field of Classification Search ........... 180/68.5; 429/100
See application file for complete search history.

(56) References Cited

U.S. PATENT DOCUMENTS

| 2,009,199 | A | * | 7/1935 | Pehotsky | 180/68.5 |
|---|---|---|---|---|---|
| 2,453,835 | A | * | 11/1948 | Donkin | 180/68.5 |
| 2,994,395 | A | * | 8/1961 | Hall | 180/68.5 |
| 3,125,177 | A | * | 3/1964 | Paller | 180/68.5 |
| 3,165,163 | A | * | 1/1965 | Holka | 180/68.5 |
| 3,866,704 | A | * | 2/1975 | Bowers et al. | 180/68.5 |
| 4,367,572 | A | | 1/1983 | Zielenski | |
| 4,535,863 | A | * | 8/1985 | Becker | 180/68.5 |
| 4,754,827 | A | * | 7/1988 | Hirabayashi | 180/68.5 |

(Continued)

FOREIGN PATENT DOCUMENTS

DE    20 37 568 A    2/1972

(Continued)

*Primary Examiner*—Jeff Restifo
(74) *Attorney, Agent, or Firm*—Dickinson Wright PLLC

(57) ABSTRACT

A device for fixing a housing (1), especially a housing pertaining to a motor vehicle battery, to a carrier plate (3). The device consists of a fixing bracket (4) and a separate fixing element (9). The fixing bracket (4) is fixed or moulded onto a edge of the carrier plate (3) projecting past the housing (1), and comprises a vertical limb (5) which extends at a distance from the housing wall, parallel to the same. The separate fixing element (9) is inserted into the intermediate region between the housing wall and the vertical limb (5) of the fixing bracket (4), and is wedged fast therein. According to the invention, the housing (1) can be fixed to the carrier plate (3) with few, simple movements and without using a tool. All parts of the fixing device can be reused if the housing (1) needs to be replaced. No scrap or other waste elements are accumulated, thus also solving the recycling problem.

20 Claims, 3 Drawing Sheets

U.S. PATENT DOCUMENTS

| | | | |
|---|---|---|---|
| 4,846,295 A * | 7/1989 | Shepard et al. | 180/68.5 |
| 4,854,540 A * | 8/1989 | Balek | 248/503 |
| 4,966,346 A * | 10/1990 | Karna et al. | 248/503 |
| 5,040,627 A * | 8/1991 | Swayze | 180/68.5 |
| 5,052,198 A * | 10/1991 | Watts | 70/58 |
| 5,086,860 A * | 2/1992 | Francis et al. | 180/68.5 |
| 5,293,951 A * | 3/1994 | Scott | 180/68.5 |
| 5,484,667 A * | 1/1996 | Sahli et al. | 429/100 |
| 5,536,595 A * | 7/1996 | Inkmann et al. | 429/120 |
| 5,547,160 A * | 8/1996 | Johnson | 248/503 |
| 5,681,668 A * | 10/1997 | Reed et al. | 429/100 |
| 5,823,502 A * | 10/1998 | Greiner et al. | 248/503 |
| 6,161,810 A * | 12/2000 | Crow et al. | 248/503 |
| 6,224,998 B1 * | 5/2001 | Brouns et al. | 429/100 |
| 6,230,834 B1 * | 5/2001 | Van Hout et al. | 180/68.5 |
| 6,290,013 B1 * | 9/2001 | Bienenstein, Jr. | 180/68.5 |
| 6,431,300 B1 * | 8/2002 | Iwase | 180/68.5 |
| 6,439,329 B1 * | 8/2002 | Vaishnav et al. | 180/68.5 |
| 6,521,371 B1 * | 2/2003 | Lavanture | 429/100 |
| 6,593,027 B1 * | 7/2003 | Osterhart et al. | 429/96 |
| 6,827,169 B1 * | 12/2004 | Van Hout et al. | 180/68.5 |
| 6,871,829 B2 * | 3/2005 | Shannon, Jr. | 248/505 |
| 6,973,987 B2 * | 12/2005 | Damon | 180/68.5 |
| 7,007,767 B2 * | 3/2006 | Damon | 180/68.5 |
| 7,185,724 B2 * | 3/2007 | Dupuis et al. | 180/68.5 |
| 2007/0119641 A1 * | 5/2007 | Tien | 180/68.5 |

FOREIGN PATENT DOCUMENTS

| | | |
|---|---|---|
| EP | 0 406 463 A | 1/1991 |
| EP | 0 429 746 A | 6/1991 |
| EP | 0 508 248 A | 10/1992 |
| EP | 0 779 668 A | 6/1997 |
| EP | 1 069 632 A | 1/2001 |
| FR | 2 779 010 A | 11/1999 |

* cited by examiner

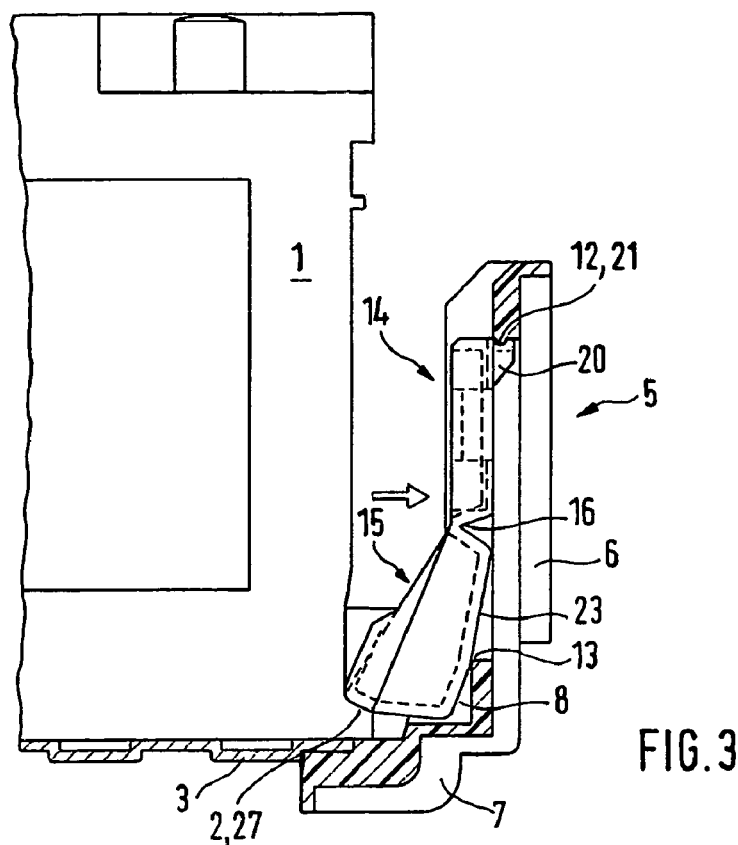
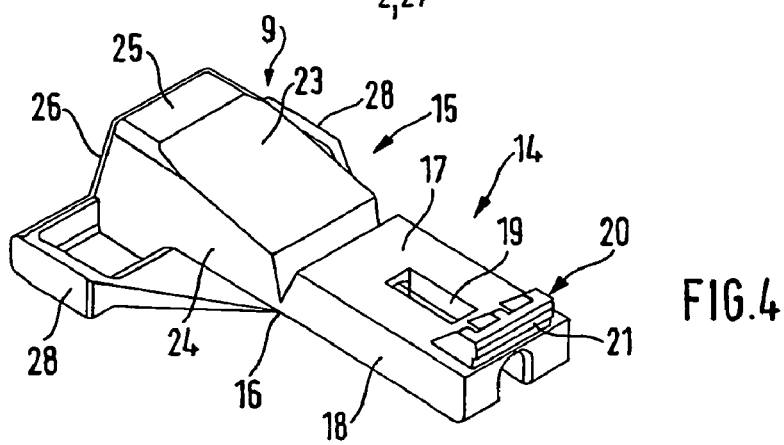
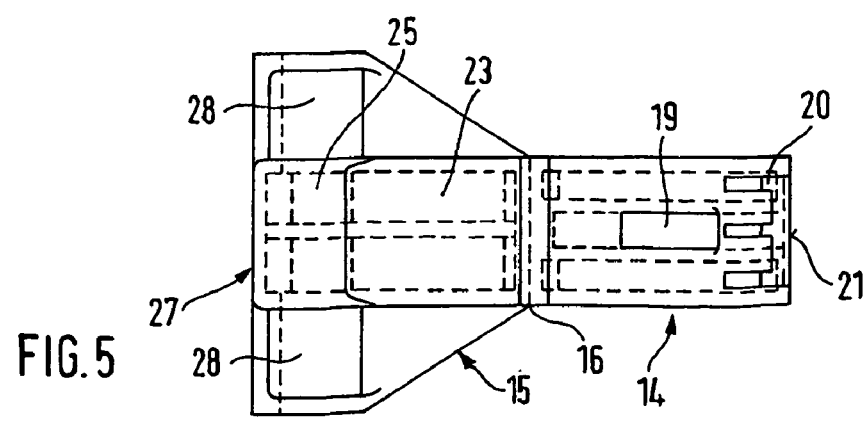
FIG.3
FIG.4
FIG.5

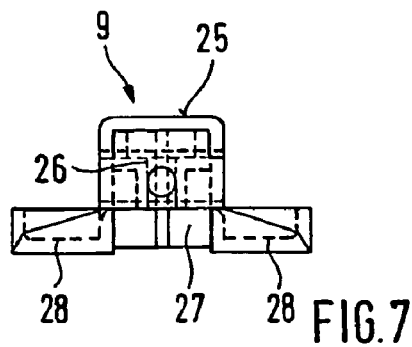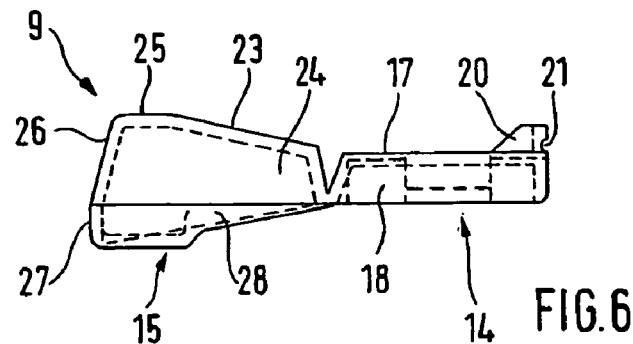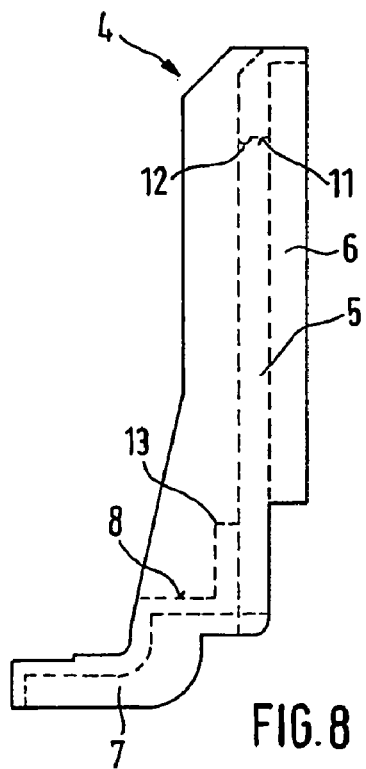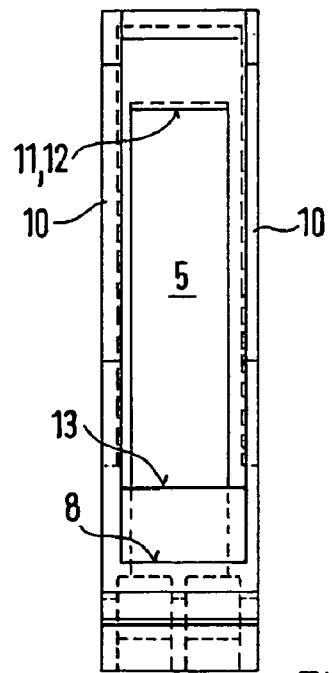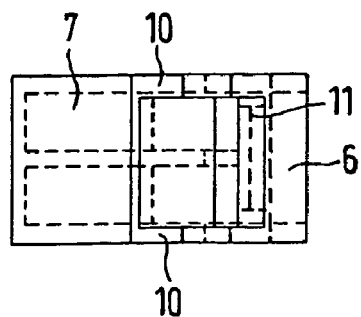

DEVICE FOR FIXING A HOUSING, ESPECIALLY A HOUSING PERTAINING TO A MOTOR VEHICLE BATTERY, TO A CARRIER PLATE

CROSS-REFERENCE TO RELATED APPLICATIONS

This application is a National Stage of International Application No. PCT/EP03/06010, filed on Jun. 7, 2003, which claims priority to German Patent Application No. 102 30 492.0, filed on Jul. 6, 2002. The disclosures of the above applications are incorporated herein by reference.

BACKGROUND OF THE INVENTION

The invention relates to a device for fixing a housing, especially the housing pertaining to a motor-vehicle battery, to a carrier plate.

Housings of motor-vehicle batteries have an essentially cubic shape. Typically, they rest on a carrier plate, one end of which is bent elastically and engages a side wall behind a step. The opposite side wall likewise has a step, and on this side the carrier plate projects past the housing base. For fixing the housing to the carrier plate, one end of a leaf spring bent into an S shape is brought into contact as an attachment flange with this step, while the other end rests on the projecting carrier plate. A screw passing through the flat middle part of the leaf spring and through the projecting part of the carrier plate is secured with a locknut. This type of attachment is complicated: it requires a series of manipulations and can be fixed and loosened again, if, e.g., the battery is to be replaced, only with the aid of a tool. Therefore, it requires a considerable amount of time. Recycling the flange and screws according to European guidelines presents another problem.

SUMMARY OF THE INVENTION

The problem to be solved by this invention is to create a device for fixing a housing, especially the housing pertaining to a motor-vehicle battery, to a carrier plate, where this device allows the housing to be fixed to the carrier with a few simple manipulations and without the use of a tool, so that it can also be loosened again quickly if need be with the use of a simple tool, if necessary. For repeated replacement of the housing or the battery, there should be no accumulation of scrap parts.

According to the invention, this problem is solved by a device, which comprises a fixing bracket and a separate fixing element, where the fixing bracket is fixed or molded onto an edge of the carrier plate projecting past the housing and a vertical limb that extends at a distance from the housing wall and is parallel thereto, and where the separate fixing element can be inserted into the intermediate region between the housing wall and the vertical limb of the fixing bracket and wedged securely therein. This can be performed quickly with minimal expenditure of force and without the aid of a tool. All of the parts of the fixing device can be reused when the housing is replaced, so that no scrap or waste parts are created.

For wedging the fixing element, preferably a contact surface for one end of the fixing element is provided on the wall of the housing and engagement means for the other end of the fixing element are provided on the vertical limb of the fixing bracket.

The contact surface on the housing wall for the one end of the fixing element can be formed by a step projecting laterally near the base; for the engagement of the other end of the fixing element, an undercut can be provided on the inside of the vertical limb of the fixing bracket. To make the engagement more secure, a catch can also be formed in the undercut.

The separate fixing element preferably consists of top and bottom parts, which are interconnected by a hinge, thereby permitting a folding motion between the two parts. This folding motion of the two parts allows the fixing element to be wedged between the housing wall and the fixing bracket.

According to a preferred embodiment of the invention, the two parts have an essentially rectangular outline, and their side surfaces opposite the hinge form an angle, which permits the folding motion between the two parts.

Preferably, a perpendicular rib for engagement with the undercut in the vertical limb of the fixing bracket is provided on the end surface on the free end of the top part. This rib can also be formed on the end surface of a cap formed on the top part.

In the top part, there is advantageously an opening, which can be engaged with a simple tool, e.g., a screwdriver, in order to release the wedging of the fixing element between the housing wall and fixing bracket again when necessary.

The intended wedging effect is improved when the bottom part increases in height from the hinge outward toward its free end; the end surface on the free end is then sloped steeply and on this end surface a support surface is formed, which can contact the side wall of the housing, preferably at the contact surface formed there by a step. The surface of the part rising from the hinge outward can contact a support edge formed in the inside of the vertical limb of the fixing bracket, so that the bottom part is supported at two or more points, while the top part is brought into engagement on the vertical limb of the fixing bracket, which produces a secure clamping effect.

According to an embodiment of the invention, the top part consists of a thin-walled, flat base and thin-walled side walls, and the bottom part consists of a thin-walled base rising from the hinge outward and thin-walled side walls. The hinged connection is then realized at the edges of the side walls of the narrow sides of the opposing parts.

Laterally extending projections can be provided on the bottom part. The end surfaces of these projections are aligned with the support surface on the free end of the part, which increases the overall support surface of the bottom part.

BRIEF DESCRIPTION OF THE DRAWINGS

The invention is described in more detail in the following with reference to the attached drawing as an example; shown are FIGS. 1-3, the fixing device according to the invention for a housing and the fixing process for the example of a motor-vehicle battery, FIG. 4, a perspective view of a fixing element of the device, FIG. 5, the top view of the fixing element according to FIG. 4, FIG. 6, a side view of the fixing element according to FIG. 4, FIG. 7, the front view of the fixing element according to FIG. 4, FIG. 8, a side view of a fixing bracket as a counterpiece to the fixing element according to FIG. 4, FIG. 9, the inside view of the fixing bracket according to FIG. 8, and FIG. 10, the top view of the fixing bracket according to FIG. 8.

DETAILED DESCRIPTION OF THE PREFERRED EMBODIMENT

Figure 1:
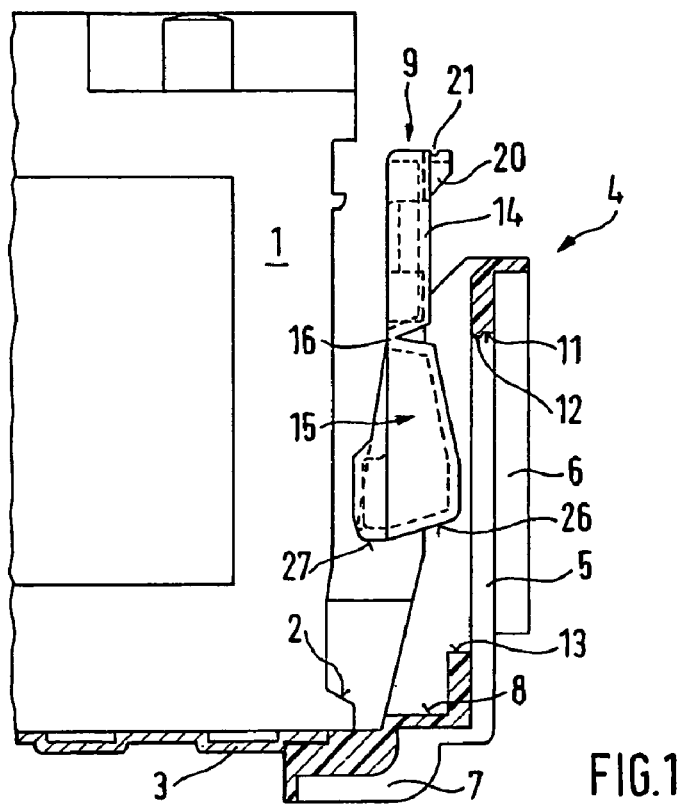
Figure 2:
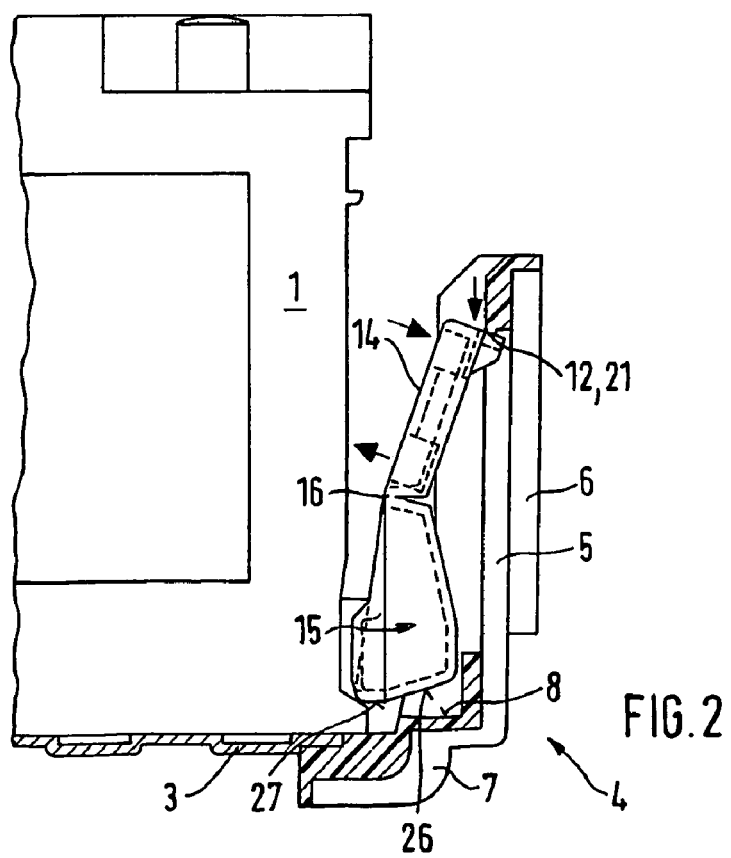

FIG. 1 shows schematically a part of the housing 1 of a motor-vehicle battery, which has, in a known way, a step 2, which is formed preferably with a slight slope, laterally across the base of the housing. The housing 1 rests on a carrier plate 3, which on this side projects past the housing 1. On this side of the carrier plate 3, there is a fixing bracket 4, which can be integrally molded with the carrier plate 3 or connected rigidly thereto in some other way. Extending from the fixing bracket 4, which is shown again separately in FIGS. 8-10, is a long vertical limb 5 parallel and at a distance to the side wall of the housing 1. A reinforcement rib 6 is preferably provided on its outer side. First of all, a shorter horizontal limb 7 is used for fixing plate 3 to the carrier and forms a right angle with the vertical limb 5 at least on the inside of the fixing bracket 4, so that here a horizontal contact surface 8 is produced for a separate fixing element 9, which, as described below with reference to FIGS. 1-3, is to be inserted and wedged between the side wall of the housing 1 and the inner surface of the vertical limb 5 of the fixing bracket 4. Side walls 10 on the vertical limb 5 of the fixing bracket 4 are used, on the one hand, for reinforcing the bracket 4 and, on the other hand, for securing the fixing element 9. An undercut 11 on the free end of the vertical limb 5, which has on its front edge a small catch 12, is used for wedging the fixing element 9 in the fixing bracket 4 (see below). In addition, in the angled region of the fixing bracket 4 on the inner side of the vertical limb 5, there is a step which provides a support edge 13 for the fixing element 9.

FIGS. 4-7 show a preferred embodiment of the fixing element 9. It consists of two parts 14, 15, which are rectangular in their outline and which are connected to each other by a hinge 16. In the illustrated embodiment, the top part 14 consists of a relatively thin-walled base 17 and reinforcing side walls 18, which give it the shape of a flat box. In the base 17 there is a slot-shaped opening 19 as possible engagement for a simple tool, e.g., a screwdriver. On the one free narrow side of the top part 14, there is a projection 20 extending over the entire width outside on the base 17 with a trapezoidal cross section, whose surface aligned with the narrow side wall of the part 14 is provided with a perpendicular rib 21. The hinged connection 16 with the bottom part 15 is realized at the edge of the opposite narrow side. The side walls of the two parts 14, 15 opposite each other are inclined outward from the hinge 16 slightly away from each other; thus they form an angle that permits hinged motion between the two parts 14, 15.

The second, bottom part 15 also consists of a thin-walled base 23 with reinforcing side walls 24, but the base 23 rises from the wall of the narrow side lying opposite the top part 14, so that the bottom part 15 increases in height toward its free end up to a flattened strip 25, from which, outwardly, a steeply inclined, free narrow side 26 is formed, which transitions into a vertical support surface 27. Blade-like projections 28 can be formed laterally on the part 15. These blades are used for reinforcing the part 15 and also for increasing the support surface 27.

The fixing of the housing 1 on the carrier plate 3 is realized according to FIGS. 1-3 in the following way:

The housing 1 is set on the carrier plate 3 and, e.g., as before, pushed with the edge (not shown in the drawing) formed on its one side wall just over its base under the surrounding elastic edge of the one side edge of the carrier plate 3, so that fixing is already achieved here. The vertical limb 5 of the fixing bracket 4 is then parallel and at a distance from the opposite side wall of the housing 1. The fixing element 9 is now inserted with the bottom part 15 increasing in height toward its free end into the intermediate region between the side wall of the housing 1 and the vertical limb 5 of the fixing bracket 4 (see FIG. 1). With the edge of its support surface 27 formed on its free end, it comes into contact on the step 2 located on the side wall of the housing 1. Due to the hinged connection 16 between the bottom part 15 and the top part 14 of the fixing element 9, a folding motion of the top part 14 reduces the angle between the opposing side surfaces of the parts 14, 15 so that the rib 21 on the free end of the top part 14 can be brought into engagement with the catch 12 in the undercut 11 of the fixing bracket 4 (see FIG. 2). In the region of the hinge 16, a force directed opposite the previous folding motion is exerted on the fixing element 9; its top part 14 is set with its base 17 again parallel to the vertical limb 5 of the fixing bracket 4; and for its part, the bottom part 15 performs a folding motion in the hinge 16, increasing the angle between the two opposing side surfaces of the parts 14, 15, whereby it slides with its support surface 27 formed on the free end completely on the inclined step 2 on the side wall of the housing 1 and is finally supported with its diagonal base 23 on the support edge 13 formed by a step on the inside of the vertical limb 5. In this folding motion, a point is reached at which the fixing element 9 can no longer automatically spring back from this position. This produces a permanent clamping effect that holds the housing 1 securely to the carrier plate 3.

This process can be practically realized without the aid of any tool. To loosen the housing 1 from the holder, a simple tool, e.g., a screwdriver, can be inserted into the opening 19 provided in the base 17 of the part 14, and the fixing element 9 can be released from its wedged position.

The invention claimed is:

1. A device for fixing a housing to a carrier plate, comprising a fixing bracket and a separate fixing element, wherein the fixing bracket is fixed onto an edge of the carrier plate projecting past the housing and a vertical limb that extends at a distance from a wall of the housing and is parallel thereto, and wherein the separate fixing element can be inserted into an intermediate region between the housing wall and the vertical limb of the fixing bracket and fixedly secured therein, wherein the fixing element comprises a top part and a bottom part, said top and bottom part being interconnected by a hinge that permits a folding motion between the top and bottom parts, and the top and bottom parts each comprise an essentially rectangular outline and a complementary set of opposing side surfaces at the hinge, wherein said complementary set of opposing side surfaces permit a folding motion between the top and bottom parts.

2. The device of claim 1, wherein a contact surface for a first end of the fixing element is provided on the wall of the housing and an engagement element for a second end of the fixing element is provided on the vertical limb of the fixing bracket.

3. The device of claim 1, wherein the housing wall comprises a laterally projecting step, said step forming a contact surface for a first end of the fixing element, and wherein the vertical limb of the fixing bracket comprises an undercut for engagement with a second end of the fixing element.

4. The device of claim 3, wherein said undercut comprises a catch for engagement with the fixing element.

5. A device for fixing a housing to a carrier plate, comprising a fixing bracket and a separate fixing element, wherein the fixing bracket is fixed onto an edge of the carrier plate projecting past the housing and a vertical limb that extends at a distance from a wall of the housing and is parallel thereto, and wherein the separate fixing element can be inserted into an intermediate region between the housing wall and the vertical limb of the fixing bracket and fixedly secured therein, wherein the fixing element comprises a top part and a bottom part, said top and bottom part being interconnected by a hinge that permits a folding motion between the top and bottom parts, and said top part comprises a perpendicular rib for engagement with the vertical limb of the fixing bracket.

6. The device of claim 5, wherein said top part comprises a projection, said projection comprising an end surface with the perpendicular rib for engagement with the vertical limb of the fixing bracket.

7. The device of claim 5, wherein a contact surface for a first end of the fixing element is provided on the wall of the housing and an engagement element for a second end of the fixing element is provided on the vertical limb of the fixing bracket.

8. The device of claim 5, wherein the housing wall comprises a laterally projecting step, said step forming a contact surface for a first end of the fixing element, and wherein the vertical limb of the fixing bracket comprises an undercut for engagement with a second end of the fixing element.

9. A device for fixing a housing to a carrier plate, comprising a fixing bracket and a separate fixing element, wherein the fixing bracket is fixed onto an edge of the carrier plate projecting past the housing and a vertical limb that extends at a distance from a wall of the housing and is parallel thereto, and wherein the separate fixing element can be inserted into an intermediate region between the housing wall and the vertical limb of the fixing bracket and fixedly secured therein, wherein the fixing element comprises a top part and a bottom part, said top and bottom part being interconnected by a hinge that permits a folding motion between the top and bottom parts, and said top part includes an opening.

10. The device of claim 9, wherein the bottom part is capable of being brought into contact with a support edge formed on the vertical limb of the fixing bracket.

11. A device for fixing a housing to a carrier plate, comprising a fixing bracket and a separate fixing element, wherein the fixing bracket is fixed onto an edge of the carrier plate projecting past the housing and a vertical limb that extends at a distance from a wall of the housing and is parallel thereto, and wherein the separate fixing element can be inserted into an intermediate region between the housing wall and the vertical limb of the fixing bracket and fixedly secured therein, wherein the fixing element comprises a top part and a bottom part, said top and bottom part being interconnected by a hinge that permits a folding motion between the top and bottom parts, and the bottom part increases in height from the hinge outward to an opposing end, said opposing end being steeply sloped and comprising a support surface, said support surface being capable of being brought into contact with the wall of the housing.

12. The device of claim 11, wherein a contact surface for a first end of the fixing element is provided on the wall of the housing and an engagement element for a second end of the fixing element is provided on the vertical limb of the fixing bracket.

13. The device of claim 11, wherein the housing wall comprises a laterally projecting step, said step forming a contact surface for a first end of the fixing element, and wherein the vertical limb of the fixing bracket comprises an undercut for engagement with a second end of the fixing element.

14. A device for fixing a housing to a carrier plate, comprising a fixing bracket and a separate fixing element, wherein the fixing bracket is fixed onto an edge of the carrier plate projecting past the housing and a vertical limb that extends at a distance from a wall of the housing and is parallel thereto, and wherein the separate fixing element can be inserted into an intermediate region between the housing wall and the vertical limb of the fixing bracket and fixedly secured therein, wherein the fixing element comprises a top part and a bottom part, said top and bottom part being interconnected by a hinge that permits a folding motion between the top and bottom parts, and the top part comprises a thin-walled flat base and a plurality of thin-walled side walls, and further wherein the bottom part consists of a thin-walled base and a plurality of thin-walled side walls.

15. A device for fixing a housing to a carrier plate, comprising a fixing bracket and a separate fixing element, wherein the fixing bracket is fixed onto an edge of the carrier plate projecting past the housing and a vertical limb that extends at a distance from a wall of the housing and is parallel thereto, and wherein the separate fixing element can be inserted into an intermediate region between the housing wall and the vertical limb of the fixing bracket and fixedly secured therein, wherein the fixing element comprises a top part and a bottom part, said top and bottom part being interconnected by a hinge that permits a folding motion between the top and bottom parts, and the bottom part comprises a plurality of laterally extending projections, said plurality of laterally extending projections comprising end surfaces that are aligned with a support surface on an end of the bottom part.

16. An apparatus for fixedly securing a housing to a carrier plate, comprising:
a fixing bracket, said fixing bracket being fixedly secured to said carrier plate and being capable of receiving said housing; and
a fixing element, said fixing element being capable of engaging with said fixing bracket and said housing such that said fixing element wedges said housing fixedly within said fixing bracket, wherein said fixing element comprises a top part and a bottom part, said top and bottom parts being operatively coupled by a hinge, and said top and bottom parts are capable of pivoting about said hinge.

17. The apparatus of claim 16, wherein said housing comprises a motor vehicle battery housing.

18. The apparatus of claim 16, wherein said fixing bracket comprises an indent, said indent being capable of coupling with said fixing element.

19. The apparatus of claim 18, wherein said fixing element further comprises a projecting rib, said projecting rib being capable of engaging with said indent.

20. The apparatus of claim 19, wherein said housing comprises a motor vehicle battery housing.

* * * * *